(12) United States Patent
Schuman (10) Patent No.: US 7,558,021 B2
(45) Date of Patent: Jul. 7, 2009

(54) HUB LOCK/HEAD CLEANING DUAL PURPOSE MECHANISM

(75) Inventor: Joel J. Schuman, Carlsbad, CA (US)

(73) Assignee: Quantum Corporation, San Jose, CA (US)

( * ) Notice: Subject to any disclaimer, the term of this patent is extended or adjusted under 35 U.S.C. 154(b) by 441 days.

(21) Appl. No.: 11/409,426

(22) Filed: Apr. 21, 2006

(65) Prior Publication Data
US 2007/0247754 A1 Oct. 25, 2007

(51) Int. Cl.
G11B 5/41 (2006.01)
G11B 15/18 (2006.01)

(52) U.S. Cl. .......................................... 360/128; 360/93
(58) Field of Classification Search .................... 360/85, 360/95, 128, 93
See application file for complete search history.

(56) References Cited

U.S. PATENT DOCUMENTS

| | | |
|---|---|---|
| 3,964,104 A | 6/1976 | Herron |
| 4,100,643 A | 7/1978 | Horian |
| 4,130,912 A | 12/1978 | Sheppard |
| 4,149,206 A | 4/1979 | Joiselle |
| 4,315,294 A | 2/1982 | Wilson |
| 4,331,993 A | 5/1982 | Pfost |
| 4,426,750 A | 1/1984 | Ariniello |
| 4,514,777 A | 4/1985 | Kudo |
| 4,586,099 A * | 4/1986 | Suzuki et al. ............... 360/128 |
| 4,620,256 A | 10/1986 | Rubey |
| 4,656,534 A | 4/1987 | Emmerich |
| 4,751,600 A | 6/1988 | Cecil |
| 4,875,125 A | 10/1989 | Joannou |
| 4,918,557 A | 4/1990 | Lee |
| 4,926,277 A | 5/1990 | Huang |
| 5,012,376 A | 4/1991 | Joannou |
| 5,113,301 A | 5/1992 | Huang |
| 5,396,392 A | 3/1995 | Watanabe |
| 5,420,729 A | 5/1995 | Lee |
| 5,420,737 A | 5/1995 | Clausen |
| 5,430,593 A | 7/1995 | Na |

(Continued)

FOREIGN PATENT DOCUMENTS

JP 61080517 A * 4/1986

(Continued)

Primary Examiner—Jefferson Evans
(74) Attorney, Agent, or Firm—Baker Botts L.L.P.

(57) ABSTRACT

An exemplary embodiment provides for a tape drive that includes one or more processors, a memory and a mechanism for locking a hub and cleaning a magnetic head. The mechanism includes a plate a brush mount assembly rotatably coupled to the plate wherein the brush mount assembly includes a brush for cleaning the magnetic head, a hub lock assembly coupled to the plate wherein the hub lock assembly includes a pin for locking the hub and a mechanism assembly coupled to the plate wherein the mechanism assembly is operable to move the hub lock assembly to lock the hub, and wherein the mechanism assembly is operable to move, concurrently with the hub lock assembly, the brush mount assembly to a position such that the brush is proximate to the magnetic hub for a cleaning operation. Also included is a controller that is operative to activate the mechanism to lock the hub and clean the magnetic head after an unthread operation and return the mechanism to a parked position after the cleaning operation.

37 Claims, 13 Drawing Sheets

U.S. PATENT DOCUMENTS

| | | |
|---|---|---|
| 5,671,108 A | 9/1997 | Clausen |
| 5,949,629 A | 9/1999 | Suzuki |
| 6,212,035 B1 | 4/2001 | Maule |
| 6,333,831 B1 | 12/2001 | Todd |
| 6,433,961 B1 | 8/2002 | Tsuchiya |
| 2001/0012169 A1* | 8/2001 | Kobayashi et al. ......... 360/72.3 |
| 2004/0136115 A1 | 7/2004 | Nayak |
| 2007/0263318 A1* | 11/2007 | Nishimura et al. ............ 360/95 |

FOREIGN PATENT DOCUMENTS

JP  04090116 A * 3/1992

* cited by examiner

HUB LOCK/HEAD CLEANING DUAL PURPOSE MECHANISM

BACKGROUND

Linear Tape-Open ("LTO") is a computer storage magnetic tape format developed as an alternative to the proprietary Digital Linear Tape ("DLT") format. The LTO roadmap calls for successive increases in capacity and speed. Due to these targets and the need to maintain, and perhaps shrink, a small drive housing form-factor, printed circuit board real estate is becoming very valuable as the need to include additional components increases. Due to this, it is becoming challenging to fit various drive mechanisms, included in previous generation LTO drives, into newer designs.

Some examples of those various mechanisms include a hub lock mechanism and a magnetic head cleaning mechanism. The hub lock mechanism is typically used to lock a take-up hub during a tape threading operation. As the name implies, the head cleaning mechanism is typically used to clean a magnetic head. Also, typically, these two mechanisms are often used in conjunction. For example, during a thread (or unthread) operation, a take-up hub will typically be locked as the head cleaner cleans the magnetic head. Due to the need for smaller drive housing form-factors, it may desirable to provide redesigns of various drive mechanisms to allow for those smaller form-factors.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, apparatuses and methods which are meant to be exemplary and illustrative, not limiting in scope. In various embodiments, one or more of the above-described problems have been reduced or eliminated.

One embodiment by way of non-limiting example provides for a tape drive that includes one or more processors, a memory and a mechanism for locking a hub and cleaning a magnetic head. The mechanism includes a plate a brush mount assembly rotatably coupled to the plate wherein the brush mount assembly includes a brush for cleaning the magnetic head, a hub lock assembly coupled to the plate wherein the hub lock assembly includes a pin for locking the hub and a mechanism assembly coupled to the plate wherein the mechanism assembly is operable to move the hub lock assembly to lock the hub, and wherein the mechanism assembly is operable to move, concurrently with the hub lock assembly, the brush mount assembly to a position such that the brush is proximate to the magnetic hub for a cleaning operation. Also included is a controller that is operative to activate the mechanism to lock the hub and clean the magnetic head after an unthread operation and return the mechanism to a parked position after the cleaning operation.

Another embodiment by way of non-limiting example provides for an integrated, single-drive mechanism for use in a tape drive enclosure wherein the mechanism performs a dual function of a hub lock and a magnetic head cleaner. The mechanism includes a plate, a rack gear movably coupled with the plate, a brush mount assembly rotatably coupled with the rack gear wherein the brush mount assembly further includes a brush for cleaning a magnetic head, a hub lock assembly for locking a hub and a link arm rotatably coupled at a first end with the hub lock assembly and rotatably coupled at a second end to the rack gear. Also included is a drive gear assembly disposed to engage the rack gear and displace the rack gear in first and second directions along a first axis, whereby displacement of the rack gear along the first axis causes responsive actuation of the brush mount assembly, link arm and the hub lock assembly.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

The following embodiments and aspects thereof are described and illustrated in conjunction with systems, apparatuses and methods which are meant to be exemplary and illustrative, not limiting in scope.

The claimed embodiments contemplate systems and apparatuses for implementing a single drive mechanism for a hub lock and a magnetic head cleaner. The mechanism is a gear and lever mechanism assembled on a mounting plate and driven via a motor on the other side of the mounting plate. On one portion of the mechanism is a hub lock pin assembly that includes a pin for locking a hub. At another portion of the mechanism is a brush mount assembly that includes a head brush assembly for cleaning a magnetic head. The mechanism is activated during thread and unthread operations and remains in a parked position otherwise. For example, during a read operation, the mechanism is not in use in that the magnetic head is not being cleaned and the hub is not locked. During an unthread operation, the pin locks the hub and the brush mount assembly is moved to an intermediate position between the parked position and a head cleaning position such that the brush mount assembly acts to bias the tape away from the head. As a result, damage to the tape and head can be avoided. Once the unthread operation is complete, the brush mount assembly is moved into place to clean the magnetic head. The cleaning is effected by having the head brush assembly in close proximity to the head and the head is moved up and down. For a thread operation, the head brush assembly is once again moved to the intermediate position for purposes of biasing the tape away from the magnetic head while the hub is locked. In another embodiment, the magnetic head is cleaned after the thread operation is complete. After either of the thread and unthread operations are completed, as described above, the mechanism is moved to a parked position.

In the context of the claimed embodiments, it should be understood that the phrase "coupled with" and phrases containing "coupled" and "with" are meant to imply that two or more bodies that are joined together in a semi-permanent fashion but can be physically separated without physical detriment to either body. Similarly, the phrase "coupled to" and phrases containing "coupled" and "to" are meant to convey two bodies that are joined together in a permanent fashion and can not be easily separated without some likelihood of damage to either body.

Figure 1:
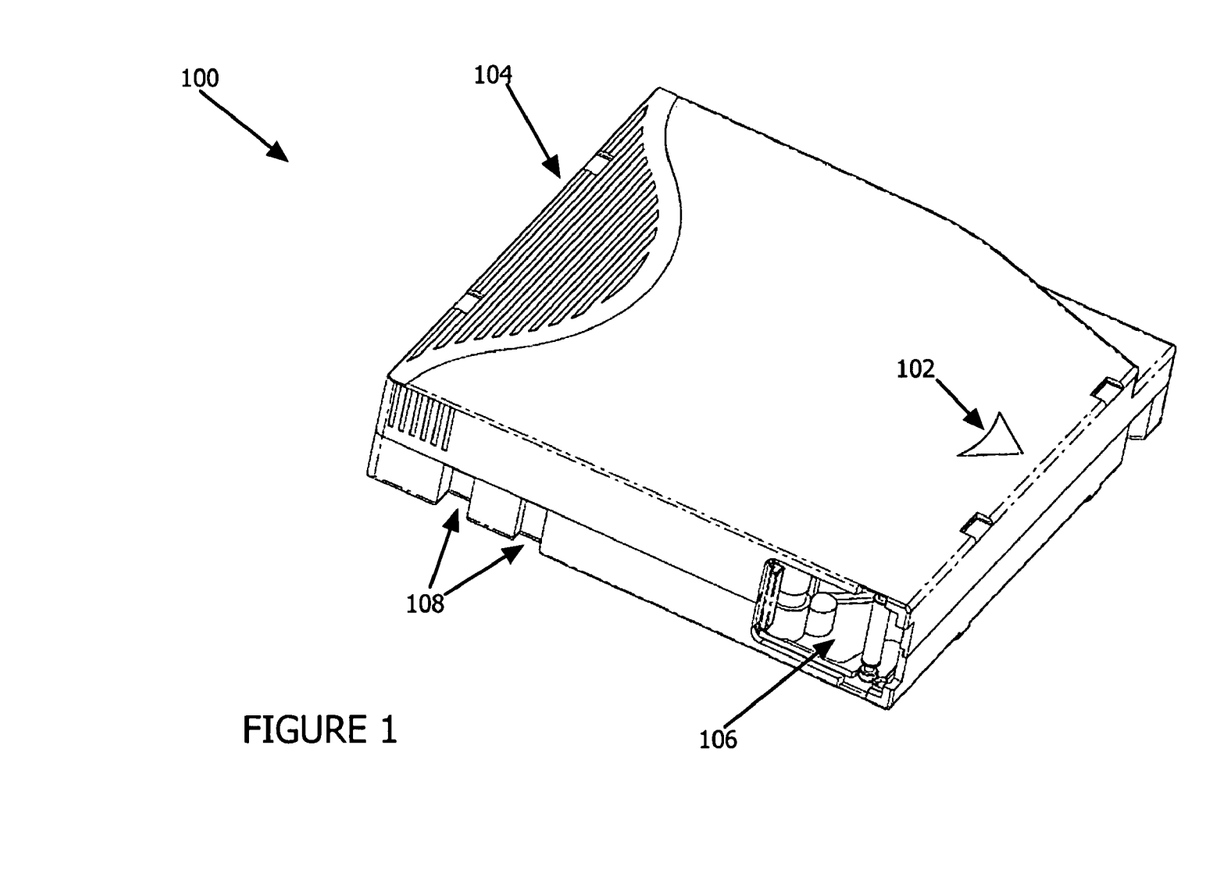
FIG. 1 illustrates a typical LTO tape cartridge.
Figure 2:
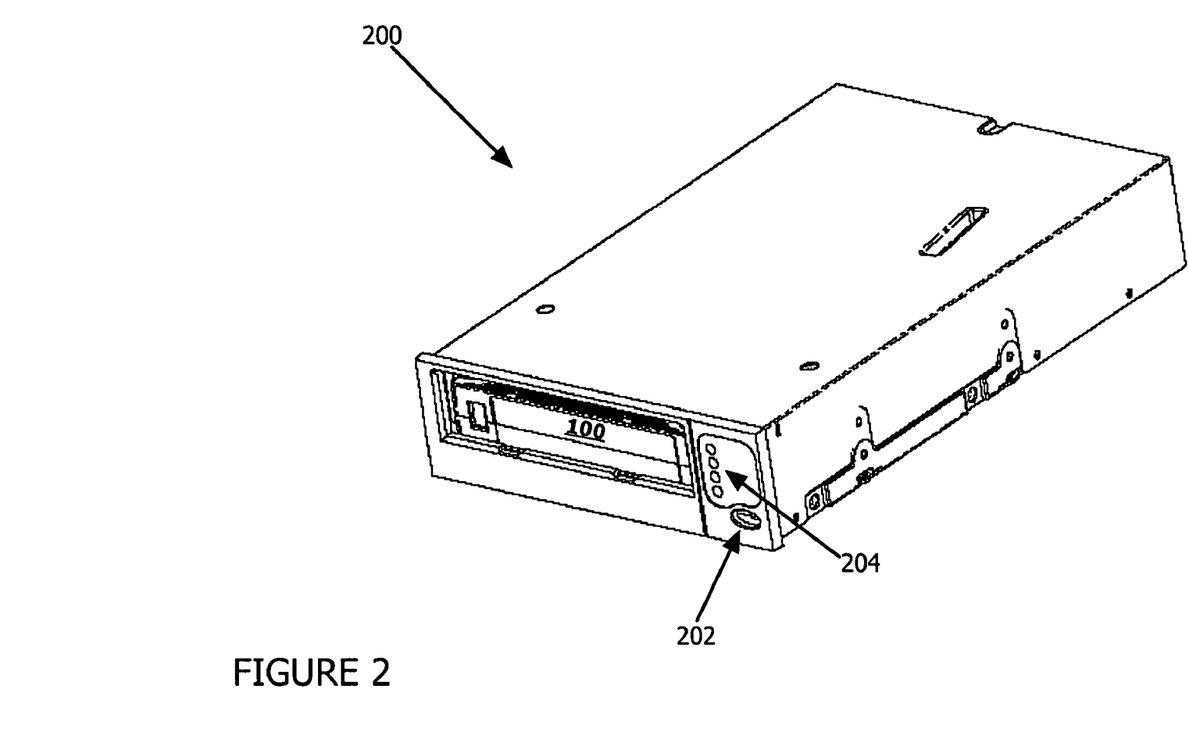
FIG. 2 illustrates a typical LTO tape drive housing with the cartridge of FIG. 1 inserted.
Figure 3:
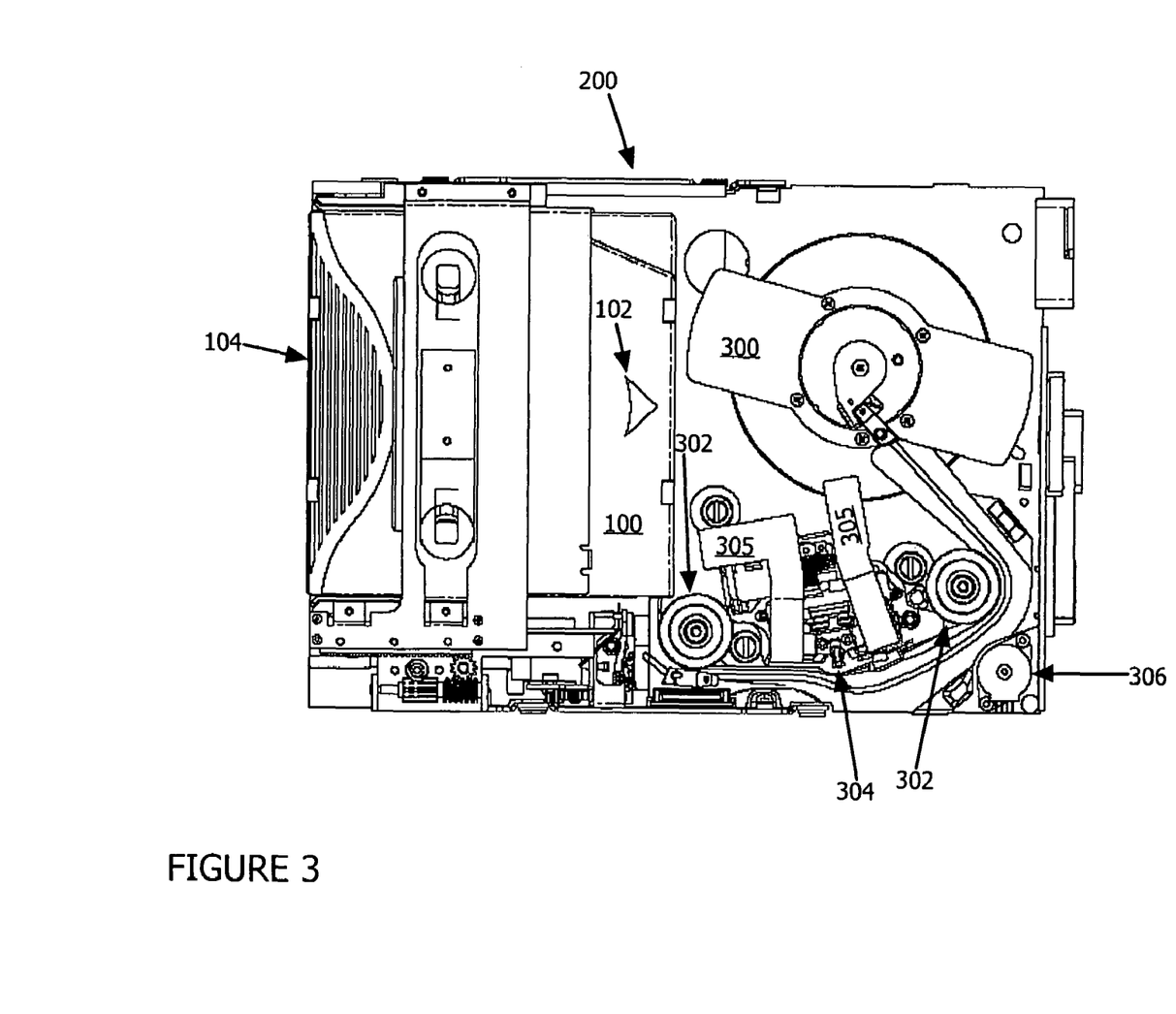
FIG. 3 is a top-down view of the cartridge inserted into a tape drive.

Before a thorough discussion of the claimed embodiments is undertaken, several figures describing a typical LTO tape cartridge and a typical drive enclosure will be presented. To that end, FIG. 1 illustrates a typical LTO tape cartridge 100, FIG. 2 illustrates a typical LTO tape drive housing 200 with the cartridge 100 of FIG. 1 inserted and FIG. 3 is a top-down view of the cartridge 100 inserted into the tape drive 200. Cartridge 100 is inserted into drive 200 in a direction specified by arrow 102. Cartridge 100 also includes grip lines 104 for easy handling. Additionally, cartridge 100 includes various lock depressions 108 (also repeated on the opposite side) that mate with a male counterpart, in drive 200, to ensure a snug fit after cartridge 100 is inserted into drive 200. Drive 200 includes an eject button 202 and various indicators 204. The drive 200 may be designed to fit into a 5.25 inch form factor for installation into a bay of a desktop or server box. Of course, other implementations are possible. For example, the drive 200 may be a stand-alone unit, such as a desktop drive that is external from a host computing system.

FIG. 3 is a top-down view of the cartridge 100 inserted into the tape drive 200. A full description of the various components of drive 200 is intentionally not included in order to not unnecessarily obscure the claimed embodiments. However, some of the major components include a take-up hub 300, various tape-threading roller guides 302, magnetic head 304, head flexures 305 and a motor 306 for driving the mechanism (not shown) of the claimed embodiments. In one implementation, the motor 306 is a servo motor. In another implementation, the motor 306 is a DC stepper motor. Drive 200 will also typically contain one or more processors, a memory and a controller.

Figure 4:
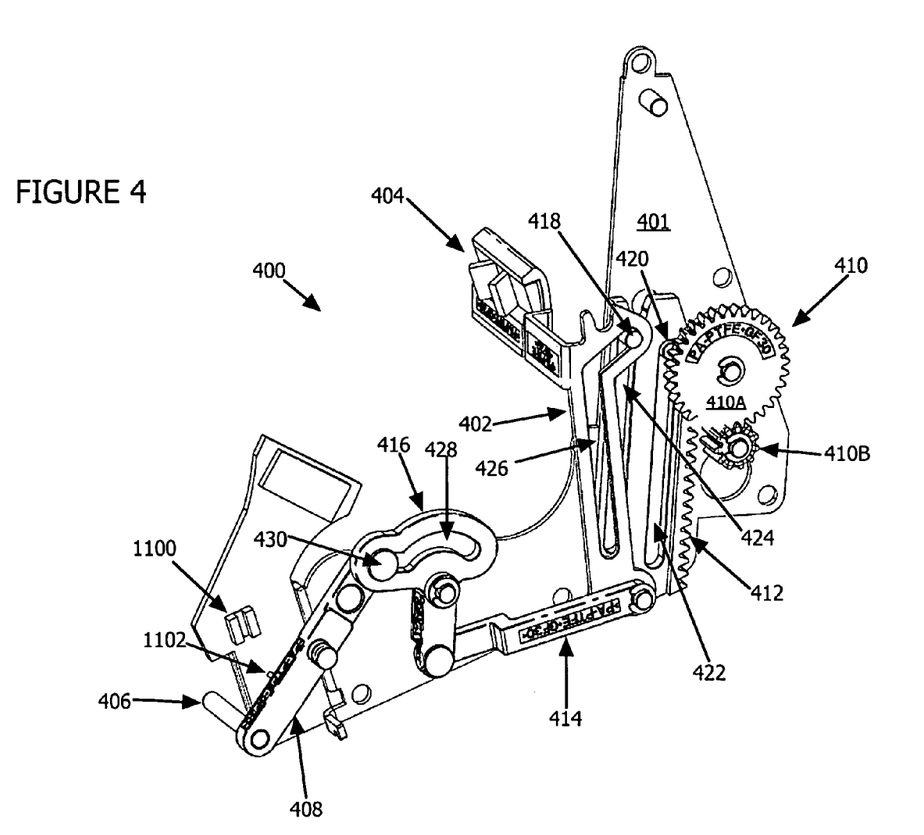
FIG. 4 illustrates a single drive mechanism for locking the hub and cleaning a magnetic head, in accordance with an exemplary embodiment.

With reference to FIG. 4, FIG. 4 illustrates a single drive mechanism 400 for locking the hub 300 of FIG. 3 and cleaning the magnetic head 304 of FIG. 3, in accordance with an exemplary embodiment. Typically, mechanism 400 is mounted on an underside of a plate 401 opposite of the top-down view of FIG. 3. As previously mentioned, mechanism 400 includes a brush mount assembly 402 that includes a head brush assembly 404 for cleaning a magnetic head (not shown). Additionally, mechanism 400 includes a hub lock pin 406 that is part of a hub lock pin assembly 408. The pin 406 is operable to lock the take-up 300 hub during a thread or un-thread operation. The mechanism is driven by a motor 306 (not shown) that is located on the other side of the plate 401. Motor 306 drives mechanism 400 via a plurality of gears (410A, 410B, 410C—refer to FIG. 6) collectively termed as a drive gear assembly 410. In turn, drive gear assembly 410 engages rack gear 412. Coupled with rack gear 412 is brush mount assembly 402 and link arm 416. Lastly, cam link 416 is coupled with link arm 414 and hub lock pin assembly 408. Mechanism 400 also includes sensors 1100 and 1102 (partly covered by assembly 408) that the disk controller utilizes to tell when mechanism 400 reaches certain positions as will be described in more detail in later sections.

When gear 410B is engaged by a motor gear (not shown) attached to motor 306, the motor gear will cause gear 410B to rotate in an opposite direction and in turn cause gear 410A to move in the same direction as the motor gear. As gear 410C is coupled with gear 410A and gear 410C engages rack gear 412, rack gear 412 will move in a straight path. This is due to the linear shape of rack gear 412, rack gear 412's linearly shaped inner regions (422,424) and associated guide posts (418, 420). As link arm 414 and brush mount assembly 402 are also coupled with rack gear 412, they will also move when rack gear 412 moves. Brush mount assembly 402 also has an inner region 426 that dictates its path of travel in conjunction with guide post 418. Due to the bend in region 426, head brush assembly will pivot inward at a park position as will be seen in subsequent sections. For reference purposes, mechanism 400, as depicted in FIG. 4 is in the parked position— brush 404 is not in proximity to magnetic head 304 and post 406 is not locking hub 300.

Since cam link 416 and hub lock pin assembly 408 are serially attached to link arm 414, they will also move when rack gear 420 moves. Due to the shape of the inner region 428 of cam link 416, hub lock pin assembly 408 will rotate for a portion proportional to the one end 430 traveling through a straight portion of inner region 428. Once end 430 reaches a curved portion of inner region 428, pin assembly 408 will stop rotating. When this occurs, the pin will have locked hub 300.

As previously indicated, mechanism 400 will typically be in a parked position when not in use. When a command is received by a controller of the drive, for example a thread or unthread command, mechanism 400 will engage motor 306 to place head brush assembly 404 at an intermediate position between the parked position and a head cleaning position. The purpose of placing assembly 404 at the intermediate position is to bias the tape away from the magnetic head. At that intermediate position, the hub 300 will also have been locked by pin 406. When the thread process is complete, the mechanism will unlock the hub 300 and place head brush assembly back to the parked position. For purposes of clarity, it should be noted that motor 306 merely engages in one direction to place the head brush assembly to the intermediate position (and lock the hub 300) and then engages in an opposite direction to place head brush assembly 404 to the parked position (and unlock hub 300).

During an unthread operation, the hub 300 is again locked by pin 406 and head brush assembly 404 is adjusted to the intermediate position while the tape is unthreaded. Once the tape is threaded, the head brush assembly 404 is moved to a cleaning position such that the assembly 404 is in close proximity to head 304. Once the unthread cleaning, mechanism 400 is returned to the parked position. As previously mentioned, the head 304 can also be cleaned, in some implementations, after a thread operation has been completed.

FIGS. 5-10 will further illustrate the parked, intermediate and cleaning positions. For each set of figures (5 and 6, 7 and 8, 9 and 10), the first figure illustrates all the components above plate 401 and the corresponding second figure has several components removed to show the underlying mechanism 400.

Figure 5:
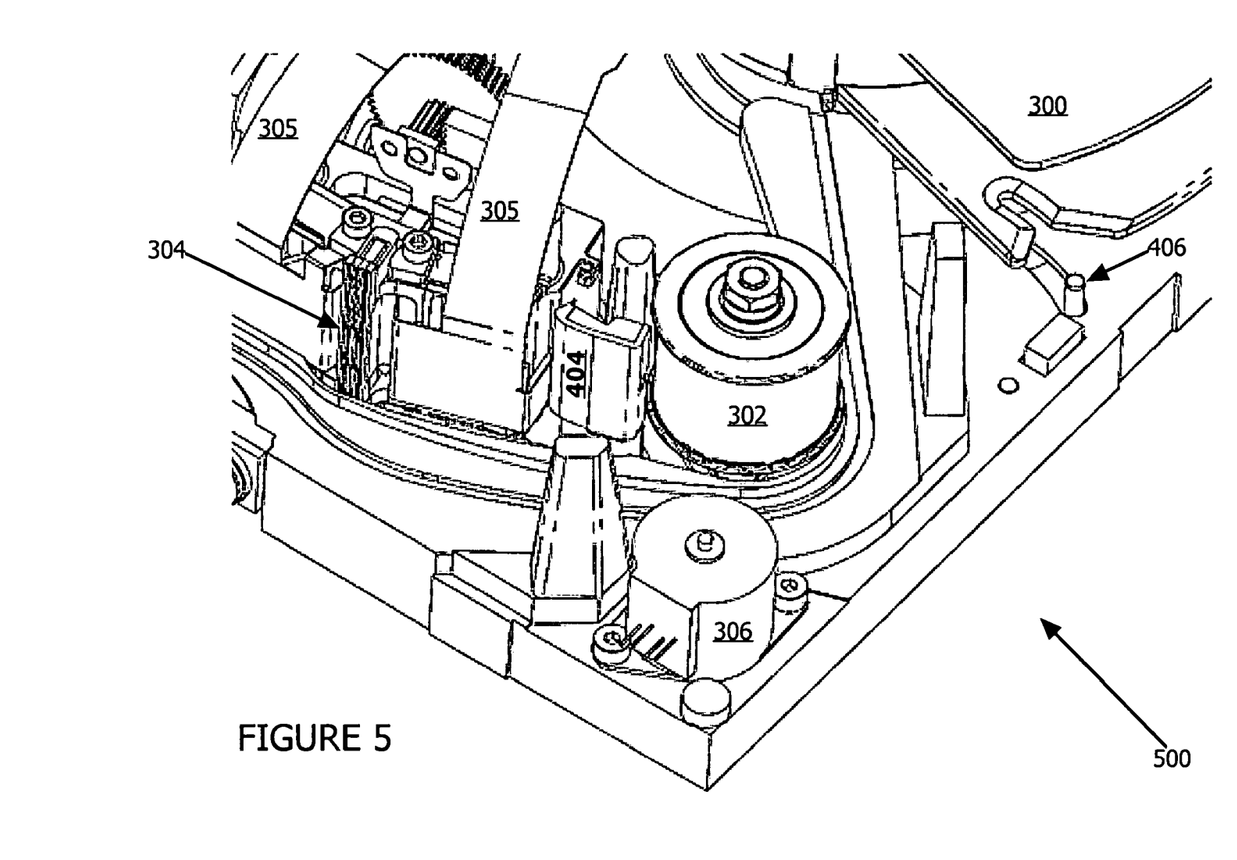
FIG. 5 illustrates a portion of the drive with the mechanism in the parked position, in accordance with an exemplary embodiment.
Figure 6:
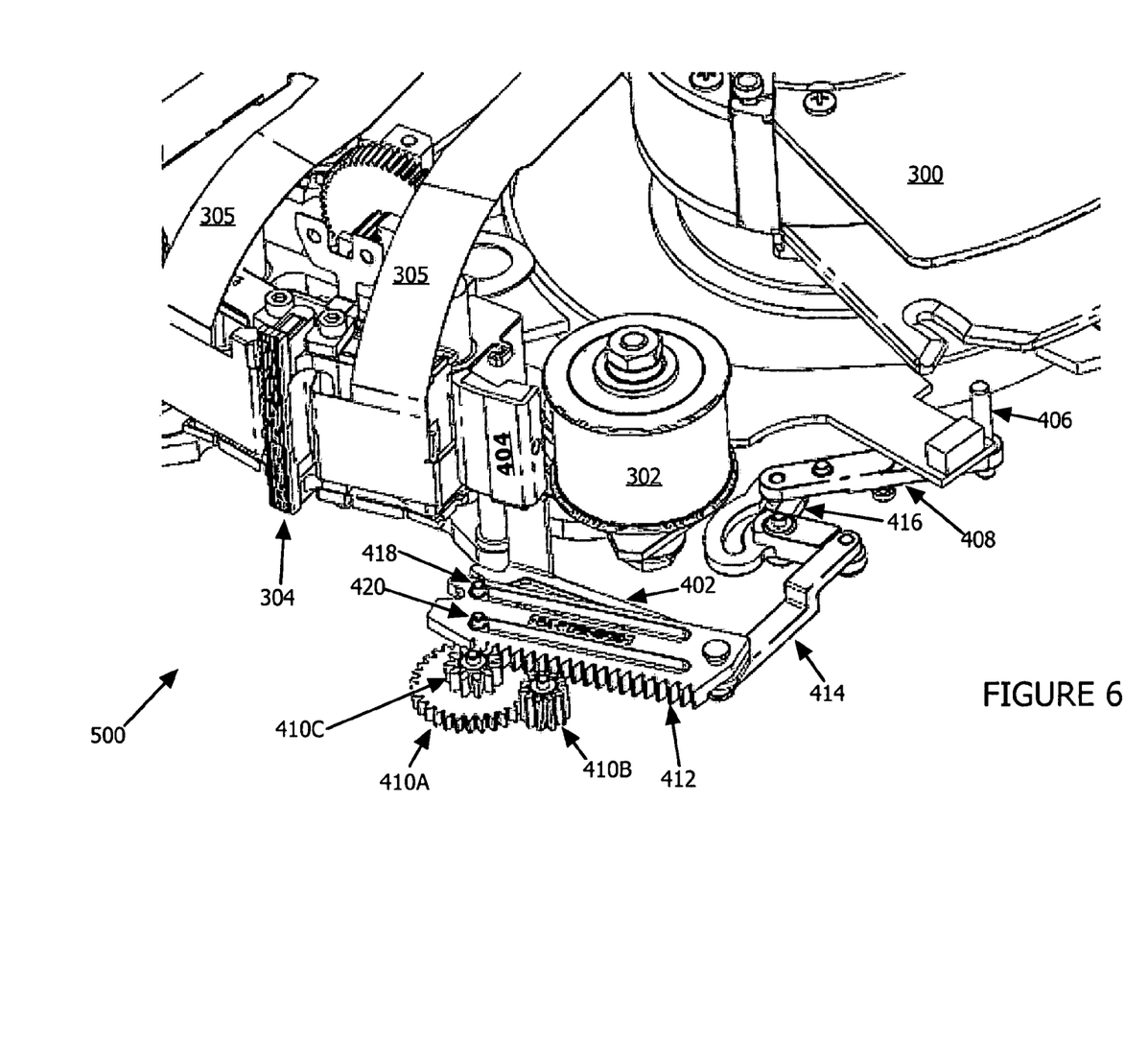
FIG. 6 illustrates an alternate view of FIG. 5 with a plate removed, in accordance with an exemplary embodiment.

The parked position 500 is illustrated via FIGS. 5-6. As can be seen, pin 406 is not locking hub 300 and head brush assembly slightly recessed between head 304 and roller guide 302. As previously mentioned, head brush assembly 404 is able to go to this recessed position due to the bend of inner region 426. Restated and referring back to FIG. 4, pin 418 will be located relative to assembly 402 at a same end as brush 404 when the mechanism 400 is in the parked position 500.

Figure 7:
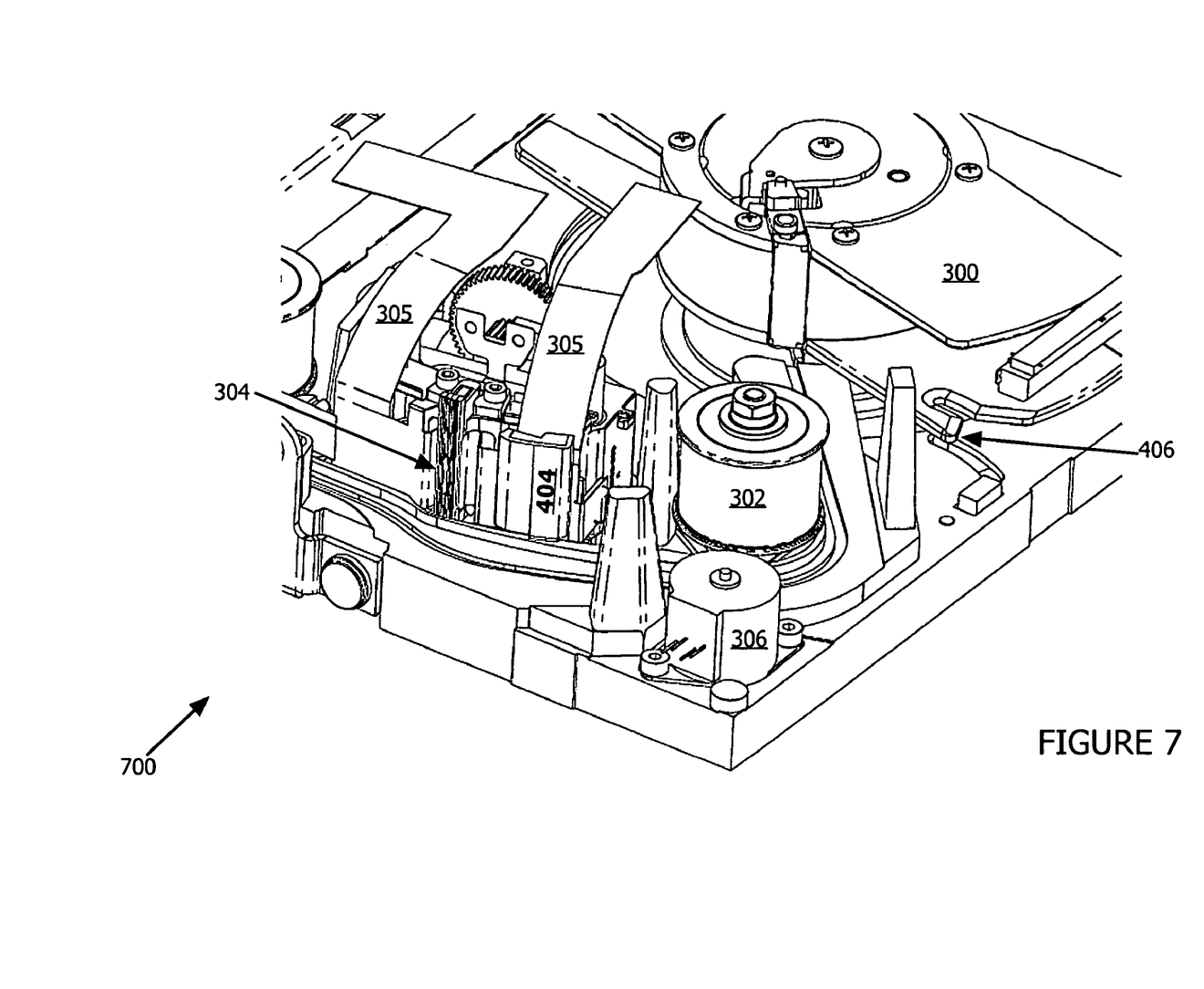
FIG. 7 illustrates a portion of the drive with the hub locked and the head cleaner at an intermediate position, in accordance with an exemplary embodiment.
Figure 8:
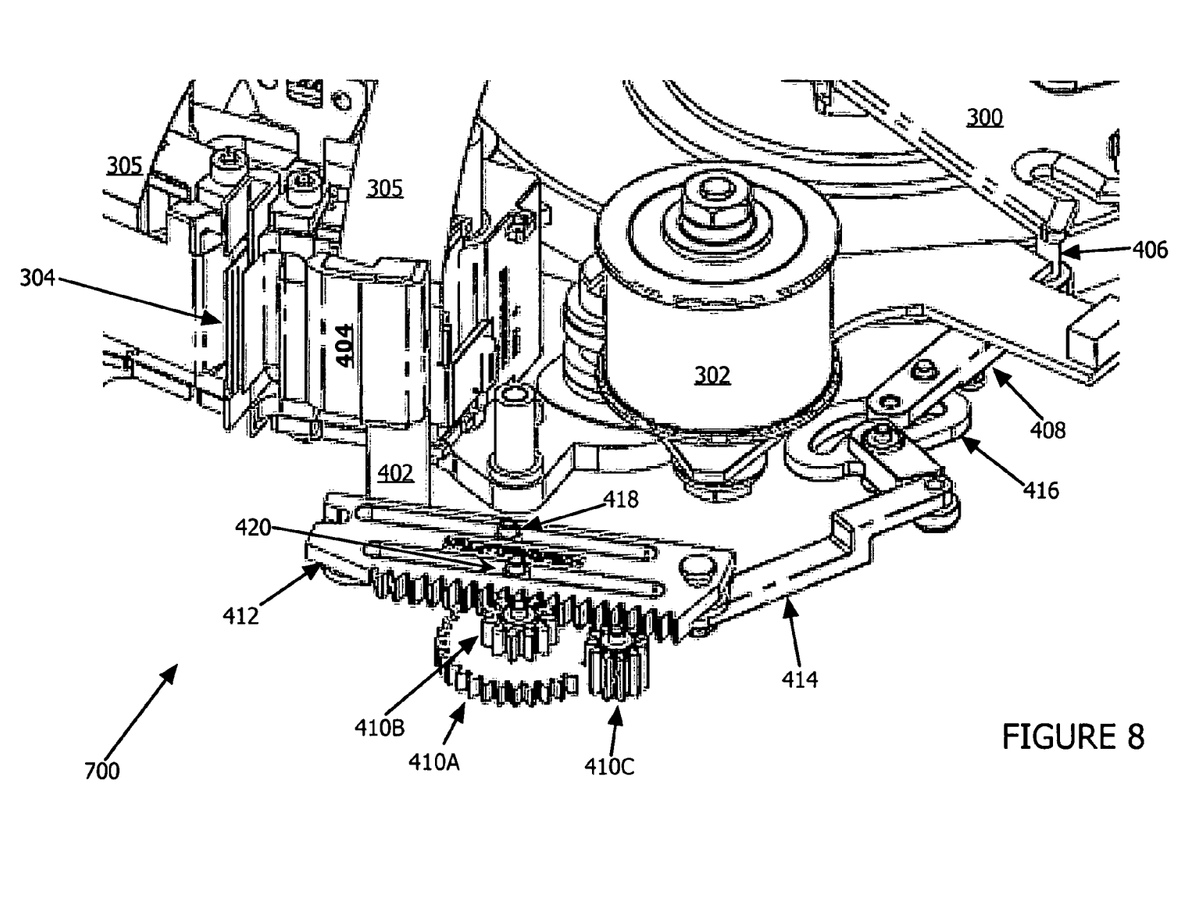
FIG. 8 illustrates an alternate view of FIG. 7 with the plate removed, in accordance with an exemplary embodiment.

FIGS. 7-8 illustrate mechanism 400 at the intermediate position 700. The intermediate position 700, as indicated by head brush assembly 404 being between the parked position and a position in proximity to head 304, is typically utilized during thread and unthread operations. At the intermediate position 700, the back of head brush assembly 404 will act to bias a tape (not shown) away from head 304. Note that with mechanism 400 at the intermediate position 700, hub 300 is locked by pin 406 and rack gear 412 is approximately halfway through its travel window as indicated by the location of guide posts 418 and 420 relative to rack gear 412. After the thread operation is completed, mechanism 400 is returned to the parked position 500.

Figure 9:
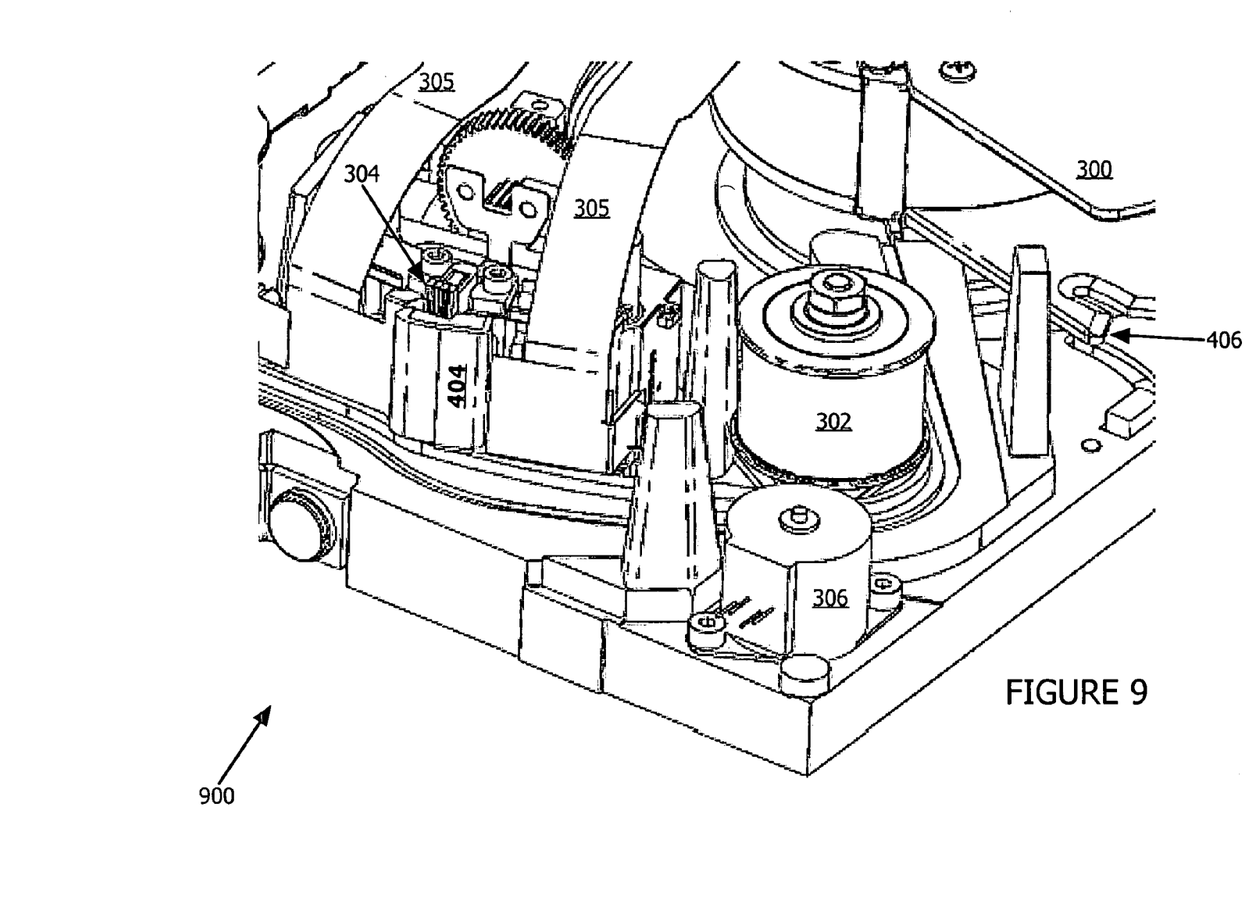
FIG. 9 illustrates a portion of the drive With the hub locked and the head cleaner at a cleaning position, in accordance with an exemplary embodiment.
Figure 10:
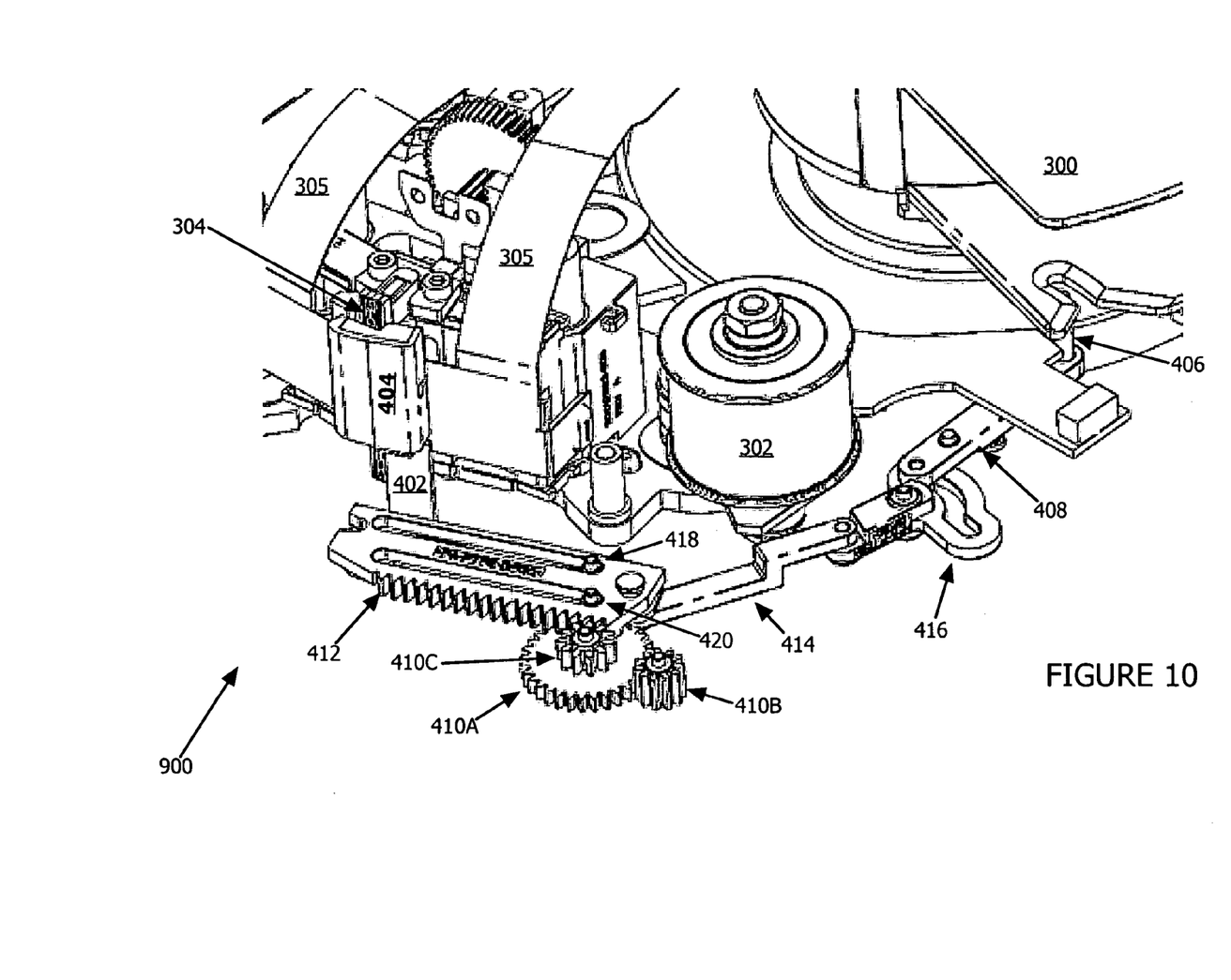
FIG. 10 illustrates an alternate view of FIG. 9 with the plate removed, in accordance with an exemplary embodiment.

FIGS. 9-10 illustrate mechanism 400 at the cleaning position 900 which is typically utilized during an unthread operation. Again, hub 300 is locked via pin 406 and brush head assembly 404 is at head 304. With assembly 404 at head 304, a cleaning operation can be carried out by having head 304 move up and down relative to assembly 404. Once the clean operation is completed, the controller returns mechanism 300 to the parked position 500.

Figure 11:
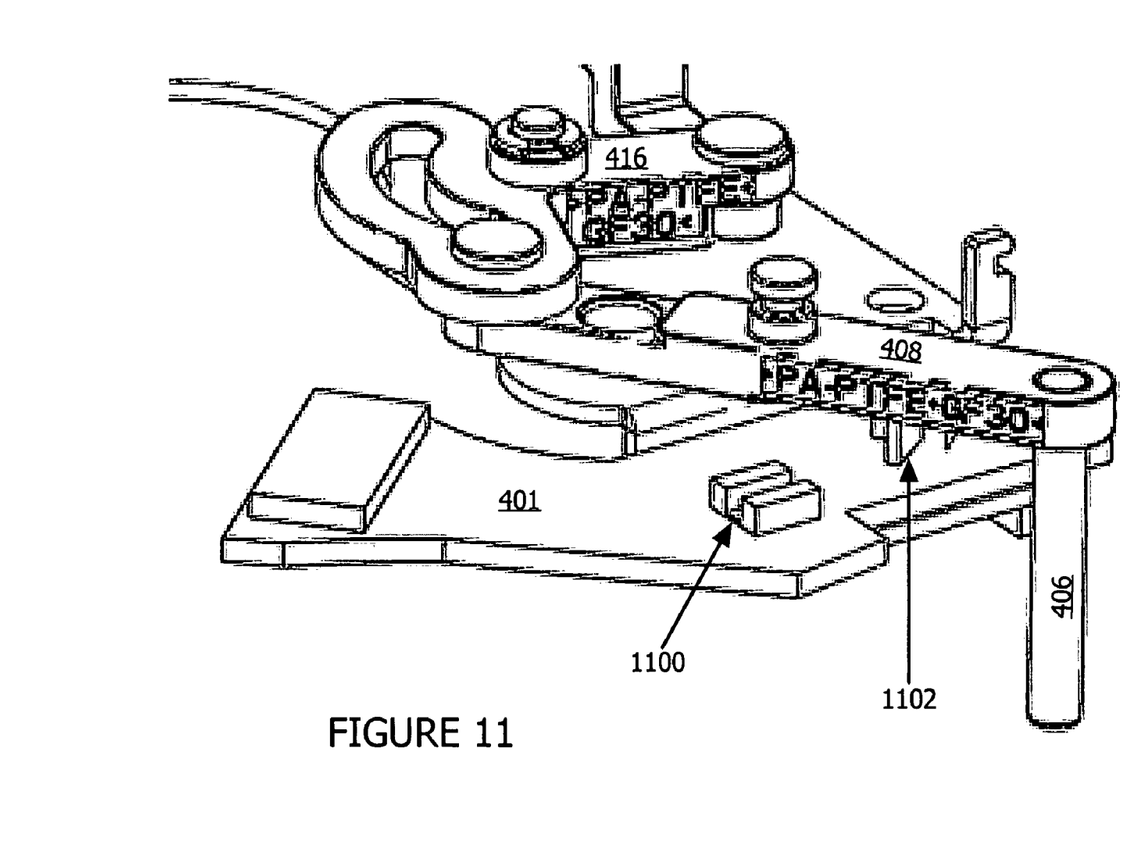
FIGS. 11-12 illustrate a portion of the mechanism including optical sensors, in accordance with an exemplary embodiment.

In order to determine when a controller of drive 202 should signal motor 306 to stop driving mechanism 400 (for example when mechanism reaches the parked position 500, the intermediate position 700 or the cleaning position 900), the controller needs to know when the various positions (500, 700, 900) are reached. This is accomplished via optical sensors (1100, 1102) on a bottom side of plate 401 and is further illustrated via FIGS. 11-12. FIG. 11 shows the hub lock pin assembly 408 and cam link 416 in the parked position 500. As can be seen, hub lock pin assembly 408 is over optical sensor 1102. When assembly 408 is moving back to the parked position 500, sensor 1102 is activated. When sensor 1102 is activated, the disk controller will stop motor 306.

Figure 12:
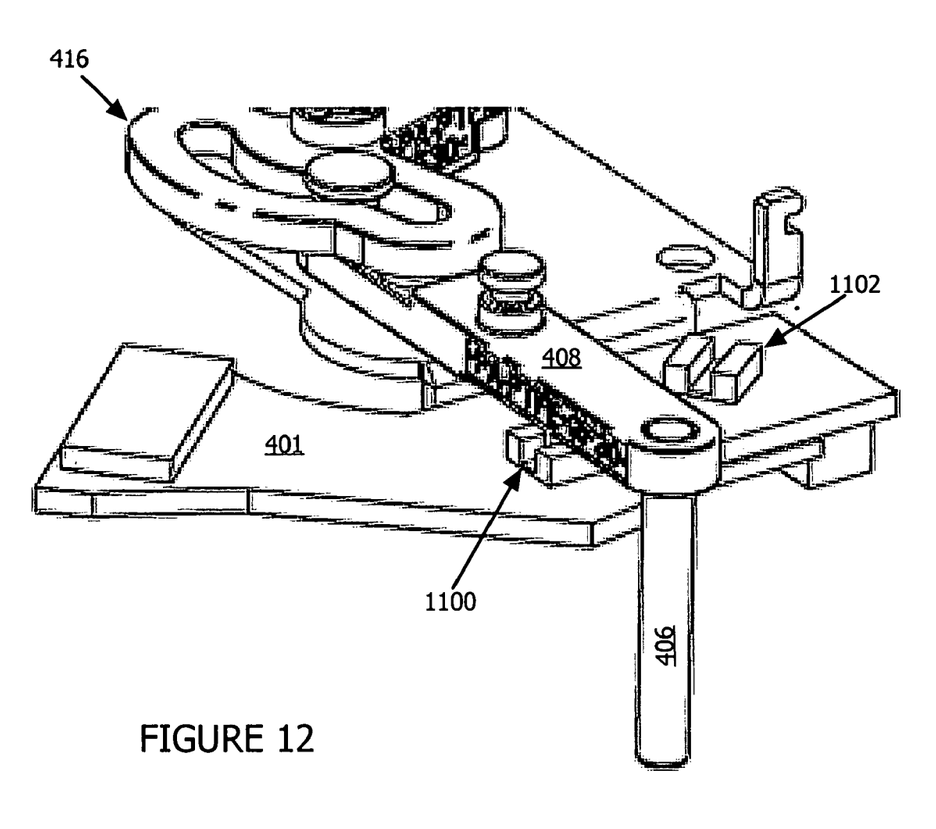

Similarly, when assembly 408 is moving from parked position to a locked position, or intermediate position for brush mount assembly 402, assembly 408 will pass over sensor 1100. Placement of sensor 1100 corresponds to when pin 406 will have locked hub 300 and when sensor 1100 is activated, the drive controller will stop motor 306 if it is desired to have the brush mount assembly 402 at the intermediate position 700. If it is desired to place the brush mount assembly 402 at the clean position 900, the drive controller knows how many more steps to step motor 306 from the intermediate position 700 to the clean position 900.

Sensors 1100 and 1102 can also be utilized to determine that drive 200 has cleared a run of tape or is ready to thread a tape.

During movement of the mechanism 400 to and from the various positions (500, 700, 900), if motor 306 stalls, the disk controller will return mechanism 400 to the park position 500 and the previous operation, interrupted by the stalled motor 306, is repeated.

Figure 13:
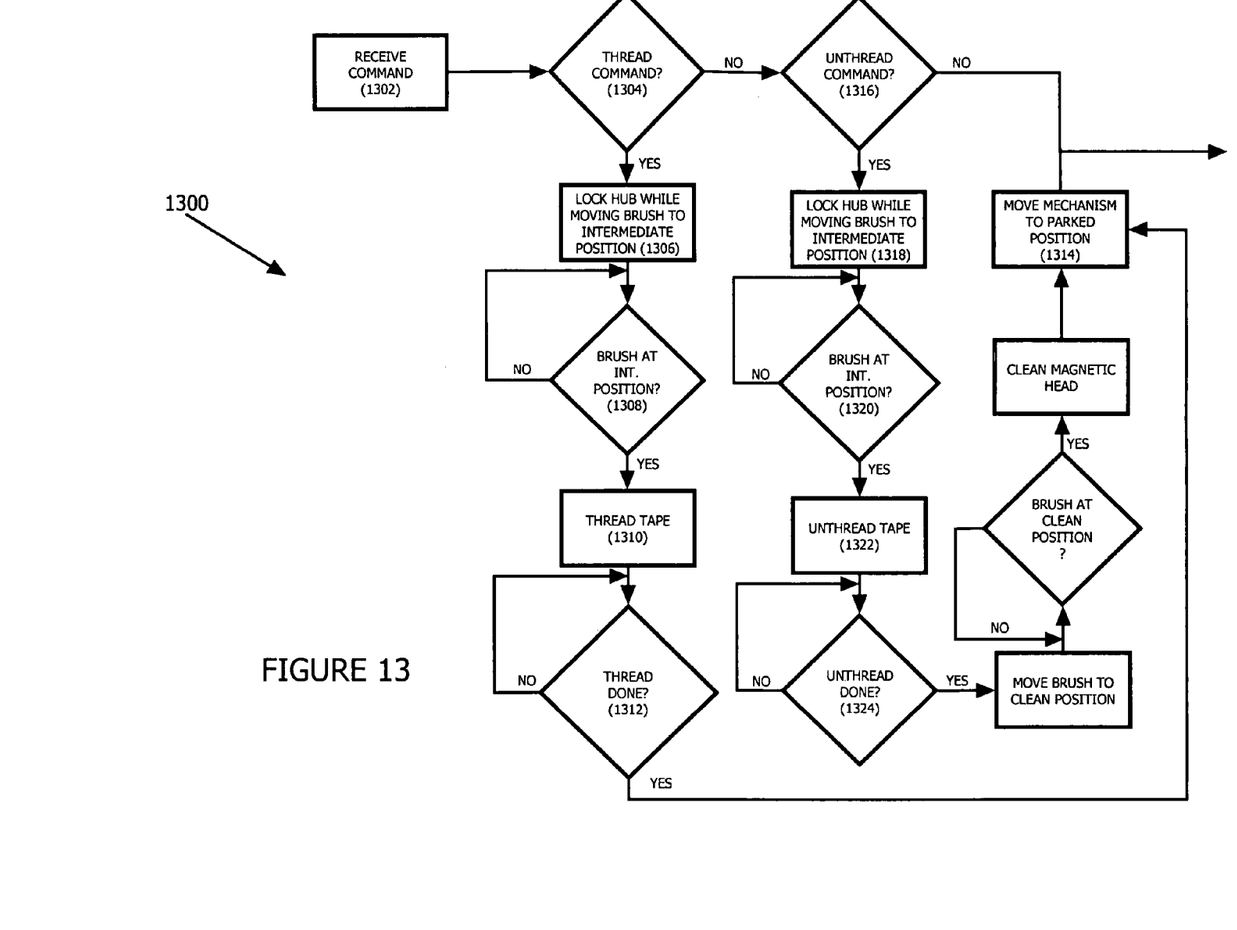
FIG. 13 is a flow chart diagram illustrating a method for processing thread and unthread commands, in accordance with an exemplary embodiment.

To further illustrate the functionality of mechanism 400 in drive 200, FIG. 13 is a flow chart diagram illustrating a method 1300 for processing thread and unthread commands, in accordance with an exemplary embodiment. Assuming that mechanism 400 is at the parked position 500, if the drive controller receives a thread command, the controller will activate motor 306 so that hub 300 will be locked and to place brush mount assembly 402 at the intermediate position 700. Once the thread operation is completed, the controller will place mechanism 400 back to the parked position 500.

If an unthread command is received, the controller will lock hub 300 and place the brush mount assembly 402 at intermediate position 700. Once the unthread operation is complete, the controller moved mechanism 400 to cleaning position 900 and the controller will move the head 304 up and down to affect cleaning. Once the head 203 has been cleaned the controller move mechanism back to the park position 500.

To explain method 1300 in more detail, the disk controller receives a command (1302) and determines if the received command is a thread command (1304). If the command is not a thread or unthread command (1304, 1316), other processing will occur. If the command is the thread command (1304), controller will turn on motor 306 so that pin 406 will lock hub 300 and move head brush assembly 404 to the intermediate position 700 (1306). Once the head brush assembly 404 is at the intermediate position 700 (1308), as would be indicated to the controller via sensor 1100, the tape threading commences (1310). While the tape is being threaded, the back of head brush assembly 404 is biasing the tape away from magnetic head 304. Once the thread operation has completed (1312), the disk controller places mechanism 400 back to the parked position 500 (1314). In another implementation, head brush assembly 404 can bias a tape away from head 304 during an unthread operation.

If the command is not a thread command (1304), the controller determines if the command is an unthread command (1316). If yes, the controller starts motor 306 to lock hub 300 and place head brush assembly 404 to the intermediate position 900 at the magnetic head 304 (1318). Once the brush head assembly 404 reaches intermediate position 700 (1320), as determined by sensor 1100, the controller starts the unthread tape operation (1322) and will continue the unthread tape operation until it finishes (1324). Next, the controller moves the mechanism 400 to clean position 900 (1326). As previously mentioned, the controller knows how many steps to step motor 306 past the intermediate position 700 so that mechanism 400 will be at the clean position 900. Once mechanism 400/head brush assembly 404 is at the clean position 900 (1328), the controller will clean the head 304 (1330) by having head 304 move up and down in proximity to head brush assembly 404. Once the magnetic head has been cleaned (1330), the controller returns mechanism 400 to the parked position 500. In another implementation, head 304 is cleaned after a thread operation only. In yet another implementation head 304 is cleaned after both thread and unthread operations.

Advantageously, the claimed embodiments provide for a single drive mechanism for locking a take-up hub of a tape drive, cleaning a magnetic head and biasing a tape away from a head during a thread or unthread operation. As a result, valuable board space is saved that directly results in a smaller form-factor for a tape drive.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. An integrated, single-drive mechanism for use in a tape drive enclosure wherein the mechanism performs a dual function of a hub lock and a magnetic head cleaner, the mechanism comprising:
   a plate;
   a rack gear movably coupled with the plate;
   a brush mount assembly rotatably coupled with the rack gear, wherein the brush mount assembly further includes a brush for cleaning a magnetic head;
   a hub lock assembly for locking a hub;
   a link arm rotatably coupled at a first end with the hub lock assembly and rotatably coupled at a second end to the rack gear; and
   a drive gear assembly disposed to engage the rack gear and displace the rack gear in first and second directions along a first axis, whereby displacement of the rack gear along the first axis causes responsive actuation of the brush mount assembly, link arm and the hub lock assembly.

2. The mechanism as recited in claim 1 wherein a pin is located at one end of the hub lock assembly.

3. The mechanism as recited in claim 2 wherein as the rack gear moves along the first axis in the first direction, the mechanism will move from a parked position to an intermediate position and from the intermediate position to a magnetic head cleaning position.

4. The mechanism as recited in claim 3 wherein as the rack gear moves along the axis in the second direction, the mechanism will move from the magnetic head cleaning position to the intermediate position and from the intermediate position to the parked position.

5. The mechanism as recited in claim 4 wherein the hub is not locked by the pin when the mechanism moves from the intermediate position to the parked position.

6. The mechanism as recited in claim 3 wherein the hub is locked by the pin when the mechanism reaches the intermediate position.

7. The mechanism as recited in claim 1 wherein the pin has locked the hub when the brush is in position to clean the magnetic head.

8. The mechanism as recited in claim 1 wherein hub lock assembly further comprises a cam link movably coupled at one end to the hub lock assembly and rotatably coupled at a second end to the link arm.

9. The mechanism as recited in claim 8 wherein the one end of the cam link has a hollow inner region that includes a linear portion and a curved portion wherein the linear portion of the hollow inner region guides the hub lock assembly during movement, and wherein the curved portion of the hollow inner region keeps the hub lock assembly stationary as the cam link continues to move.

10. The mechanism as recited in claim 1 wherein the brush mount assembly has a hollow inner region, and wherein a guide pin located on the plate is coincident with the hollow inner region such that the guide pin guides the brush mount assembly during movement.

11. The mechanism as recited in claim 1 wherein a motor coupled with the drive gear assembly drives the mechanism.

12. The mechanism as recited in claim 11 wherein the motor is a DC stepper motor.

13. The mechanism as recited in claim 11 wherein the motor is a servo motor.

14. The mechanism as recited in claim 1 wherein the drive gear assembly is a plurality of gears.

15. An integrated, single-drive mechanism for use in a data storage device enclosure wherein the mechanism performs a dual function of a hub lock and a magnetic head cleaner, the mechanism comprising:
   a plate;
   a rack gear with a first rack gear end and a second rack gear end;
   a link arm with a first link arm end and a second link arm end wherein the first link arm end is rotatably coupled with the second rack gear end;
   a brush mount assembly with a first brush mount assembly end and a second brush mount assembly end wherein the second brush mount assembly end is rotatably coupled with the second rack gear end and the first link arm end, and wherein a brush for cleaning a magnetic head is located at the first brush mount assembly end;
   a cam link with a first cam link-end and a second cam link end wherein the cam link is rotatably coupled with the plate, and wherein the first cam link end is rotatably coupled with the second link arm end;
   a hub lock assembly with a first hub lock assembly end and a second hub lock assembly end wherein the hub lock assembly is rotatably coupled with the plate, and wherein the first hub lock assembly end is movably coupled with the second cam link end, and wherein a pin for locking a hub is located at the second hub lock assembly end; and
   a drive gear assembly rotatably coupled with the plate and disposed to engage the rack gear in first and second directions along a first axis, whereby displacement of the rack gear along the first axis causes responsive displacement of the link arm, the brush mount assembly, the cam link and the hub lock assembly.

16. The mechanism as recited in claim 15 wherein as the rack gear moves along the first axis in the first direction, the mechanism will move from a parked position to an intermediate position and from the intermediate position to a magnetic head cleaning position.

17. The mechanism as recited in claim 16 wherein as the rack gear moves along the axis in the second direction, the mechanism will move from the magnetic head cleaning position to the intermediate position and from the intermediate position to the parked position.

18. The mechanism as recited in claim 17 wherein the hub is not locked by the pin when the mechanism moves from the intermediate position to the parked position.

19. The mechanism as recited in claim 16 wherein the hub is locked by the pin when the mechanism reaches the intermediate position.

20. The mechanism as recited in claim 15 wherein the pin has locked the hub when the brush is in position to clean the magnetic head.

21. The mechanism as recited in claim 15 wherein the pin has locked the hub when the brush is in position to clean the magnetic head.

22. The mechanism as recited in claim 15 wherein the brush mount assembly has a hollow inner region, and wherein a guide pin located on the plate is coincident with the hollow inner region such that the guide pin guides the brush mount assembly during movement.

23. The mechanism as recited in claim 15 wherein the second cam link end has a hollow inner region that includes a linear region and a curved region wherein the linear portion of the hollow inner region guides the hub lock assembly during movement, and wherein the curved portion of the hollow inner region keeps the hub lock assembly stationary as the cam link continues to move.

24. The mechanism as recited in claim 15 wherein the mechanism has an intermediate position between a parked position and a magnetic head cleaning position wherein the intermediate position allows the brush to bias tape away from the magnetic, head during thread and unthread operations.

25. The mechanism as recited in claim 24 wherein one or more optical sensors determine when the brush mount assembly reaches the intermediate position.

26. The mechanism as recited in claim 15 wherein a motor coupled with the drive gear assembly drives the mechanism.

27. The mechanism as recited in claim 26 wherein the motor is a DC stepper motor.

28. The mechanism as recited in claim 26 wherein the motor is a servo motor.

29. The mechanism as recited in claim 26 wherein the drive gear assembly is a plurality of gears.

30. A tape drive comprising:
   one or more processors;
   a memory;
   a mechanism for locking a hub and cleaning a magnetic head wherein the mechanism includes:
      a plate;
      a brush mount assembly rotatably coupled to the plate wherein the brush mount assembly includes a brush for cleaning the magnetic head;
      a hub lock assembly coupled to the plate wherein the hub lock assembly includes a pin for locking the hub; and
      a mechanism assembly coupled to the plate wherein the mechanism assembly is operable to move the hub lock assembly to lock the hub, and wherein the mechanism assembly is operable to move, concurrently with the hub lock assembly, the brush mount assembly to a position such that the brush is proximate to the magnetic hub for a cleaning operation; and
   a controller operative to:
      activate the mechanism to lock the hub and clean the magnetic head after an unthread operation; and
      return the mechanism to a parked position after the unthread operation.

31. The tape drive as recited in claim 30 wherein the unthread operation is a thread operation.

32. The tape drive as recited in claim 30 wherein the controller is further operative to place a magnetic head cleaner of the mechanism at an intermediate point between the parked position and a cleaning position whereby the magnetic head cleaner biases tape away from the magnetic head during thread and unthread operation.

33. The tape drive as recited in claim 32 further comprising one or more optical sensors for determining when the mechanism is at the intermediate position and a parked position.

34. The tape drive as recited in claim 30 further comprising a motor for driving the mechanism.

35. The tape drive as recited in claim 34 wherein the motor is a DC stepper motor.

36. The tape drive as recited in claim 34 wherein the motor is a servo motor.

37. An integrated, single-drive mechanism for use in a data storage device enclosure wherein the mechanism performs a dual function of a hub lock and a magnetic head cleaner, the mechanism comprising:
   a plate;
   a brush mount assembly rotatably coupled to the plate wherein the brush mount assembly includes a brush for cleaning the magnetic head;
   a hub lock assembly coupled to the plate wherein the hub lock assembly includes a pin for locking the hub; and
   a mechanism assembly coupled to the plate wherein the mechanism assembly is operable to move the hub lock assembly to lock the hub, and wherein the mechanism assembly is operable to move, concurrently with the hub lock assembly, the brush mount assembly to a position such that the brush is proximate to the magnetic hub for a cleaning operation.

* * * * *